United States Patent
Sugaya

(10) Patent No.: US 10,440,331 B2
(45) Date of Patent: Oct. 8, 2019

(54) SYSTEM, METHOD, AND PROGRAM FOR IMAGE ANALYSIS

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 15/553,607

(22) PCT Filed: Oct. 31, 2016

(86) PCT No.: PCT/JP2016/082296
§ 371 (c)(1),
(2) Date: Aug. 25, 2017

(87) PCT Pub. No.: WO2018/078861
PCT Pub. Date: May 3, 2018

(65) Prior Publication Data
US 2018/0350091 A1    Dec. 6, 2018

(51) Int. Cl.
*H04N 7/18* (2006.01)
*G06K 9/00* (2006.01)
*H04N 5/232* (2006.01)

(52) U.S. Cl.
CPC ............ *H04N 7/18* (2013.01); *G06K 9/00* (2013.01); *H04N 5/23229* (2013.01)

(58) Field of Classification Search
None
See application file for complete search history.

(56) References Cited

U.S. PATENT DOCUMENTS

| 8,929,611 | B2 * | 1/2015 | Tanaka | G06K 9/00288 |
| | | | | 382/115 |
| 2011/0222743 | A1 | 9/2011 | Tanaka et al. | |
| 2015/0022627 | A1 | 1/2015 | Sato et al. | |

FOREIGN PATENT DOCUMENTS

| JP | 2000-306095 | 11/2000 |
| JP | 2009-225097 | 10/2009 |
| JP | 2011-192093 | 9/2011 |
| JP | 2015-23512 | 2/2015 |
| JP | 2016-51904 | 4/2016 |

* cited by examiner

*Primary Examiner* — Christopher Braniff
(74) *Attorney, Agent, or Firm* — Lex IP Meister, PLLC

(57) ABSTRACT

The system for image analysis that analyzes an image taken by a camera improves the accuracy of detection and identification in image analysis. The system memorizes a plurality of imaging environment data sets that include setting data of a camera and data on an object; includes a detection module 211 that detects an imaging environment from the camera, a check module 212 that checks the imaging environment, and an extraction module 213 that extracts an imaging environment data set similar to the detected imaging environment; and applies the extracted imaging environment data set and analyzes an image.

5 Claims, 9 Drawing Sheets

| Imaging data set | Imaging angle | Type | Distance | Illuminance | Place | Weather | Type of camera | Resolution | Initial value for image analysis |
|---|---|---|---|---|---|---|---|---|---|
| Set1 | 10 degrees | Human | 3 m | 100 lux | Outside | Cloudy | Camera X | 2.5 million pixels | ParamA |
| Set2 | 15 degrees | Device | 10 m | 200 lux | Inside | — | Wearable Z | 5 million pixels | ParamB |
| Set3 | 45 degrees | Animal | 5 m | 500 lux | Inside | — | Camera Y | 4 million pixels | ParamC |
| Set4 | 30 degrees | Plant | 8 m | 240 lux | Outside | Clear | Camera Z | 5 million pixels | ParamD |
| ⋮ | | | | | | | | | |

FIG. 6

| Imaging data set | Imaging angle | Type | Distance | Illuminance | Place | Weather | Type of camera | Resolution | Initial value for image analysis |
|---|---|---|---|---|---|---|---|---|---|
| Set1 | 10 degrees | Human | 3 m | 100 lux | Outside | Cloudy | Camera X | 2.5 million pixels | ParamA |
| Set2 | 15 degrees | Device | 10 m | 200 lux | Inside | — | Wearable Z | 5 million pixels | ParamB |
| Set3 | 45 degrees | Animal | 5 m | 500 lux | Inside | — | Camera Y | 4 million pixels | ParamC |
| Set4 | 30 degrees | Plant | 8 m | 240 lux | Outside | Clear | Camera Z | 5 million pixels | ParamD |
| Set5 | 25 degrees | Plant | 7 m | 250 lux | Outside | Clear | Camera Z | 5 million pixels | ParamD |
| : : | | | | | | | | | |
| | | | | | | | | | |

FIG. 7

SYSTEM, METHOD, AND PROGRAM FOR IMAGE ANALYSIS

TECHNICAL FIELD

The present invention relates to a system, a method, and a program for image analysis that improve the accuracy of detection and identification in image analysis by the use of parameters adapted to the environment in which the image is taken, in the system for image analysis that analyzes an image taken by a camera.

BACKGROUND Art

Some imaging devices are capable to take an image by using imaging setting information of the same content as that of a recorded image taken in the past (Patent Document 1).

CITATION LIST

Patent Literature

Patent Document 1: JP 2009-225097 A

SUMMARY OF INVENTION

However, the device of Patent Document 1 needs to apply the imaging setting information of the same content as that of a recorded image before taking an image and thus cannot perform appropriate image processing for an image that has already been taken. In recent years, there has been a need for image analysis that processes a large number of images containing various objects that were taken with a camera mounted on an uninhabited airborne vehicle, a wearable device, a security camera, etc. In this case, the technique described in Patent Document 1 that requires the settings before an image is taken is inappropriate. Moreover, parameter adjustment is required to improve the detection and the identification of an object for the purpose of the image analysis. The adjustment is undesirably a time-consuming or a troublesome process.

In view of the above-mentioned problems, an objective of the present invention is to provide a system, a method, and a program for image analysis that improve the accuracy of detection and identification in image analysis by the use of parameters adapted to the environment in which the image is taken, in the system for image analysis that analyzes an image taken by a camera.

The first aspect of the present invention provides a system for image analysis, including:

a memory unit that memorizes a plurality of imaging environment data sets that include setting data of a camera that takes an image and data on an object;

a detection unit that detects the imaging environment of the image from the camera;

a check unit that checks the detected imaging environment with the imaging environment data sets in the memory unit;

an extraction unit that extracts an imaging environment data set similar to the detected imaging environment from the plurality of the memorized imaging environment data sets based on the check result; and an image analysis unit that applies the extracted imaging environment data set and analyzes the image.

According to the first aspect of the present invention, the system for image analysis includes: a memory unit that memorizes a plurality of imaging environment data sets that include setting data of a camera that takes an image and data on an object; a detection unit that detects the imaging environment of the image from the camera; a check unit that checks the detected imaging environment with the memorized imaging environment data sets; an extraction unit that extracts an imaging environment data set similar to the detected imaging environment from the plurality of the memorized imaging environment data sets based on the check result; and an image analysis unit that applies the extracted imaging environment data set and analyzes the image.

The first aspect of the present invention is the category of a system for image analysis, but the categories of a method and a program for image analysis have similar functions and effects.

The second aspect of the present invention provides the system according to the first aspect of the present invention, in which the memory unit memories the imaging environment data set applied by the image analysis unit as a new imaging environment data set.

According to the second aspect of the present invention, in the system according to the first aspect of the present invention, the memory unit memories the imaging environment data set applied by the image analysis unit as a new imaging environment data set.

The third aspect of the present invention provides the system according to the first or the second aspect of the present invention, in which the imaging environment data set is 360-degree imaging data.

According to the third aspect of the present invention, in the system according to the first or the second aspect of the present invention, the imaging environment data set is 360-degree imaging data.

The fourth aspect of the present invention provides the system according to any one of the first to the third aspects of the present invention, in which the imaging environment data set includes the angle of the camera and the distance from the camera to the object.

According to the fourth aspect of the present invention, in the system according to any one of the first to the third aspects of the present invention, the imaging environment data set includes the angle of the camera and the distance from the camera to the object.

The fifth aspect of the present invention provides a method for image analysis, including the steps of:

memorizing a plurality of imaging environment data sets that include setting data of a camera that takes an image and data on an object;

detecting the imaging environment of the image from the camera;

memorizing a plurality of imaging environment data sets that include setting data of a camera that takes an image and data on an object;

extracting an imaging environment data set similar to the detected imaging environment from the plurality of the memorized imaging environment data sets based on the check result; and applying the extracted imaging environment data set and analyzing the image.

The sixth aspect of the present invention provides a program for image analysis to execute the steps of:

memorizing a plurality of imaging environment data sets that include setting data of a camera that takes an image and data on an object;

detecting the imaging environment of the image from the camera;

memorizing a plurality of imaging environment data sets that include setting data of a camera that takes an image and data on an object;

extracting an imaging environment data set similar to the detected imaging environment from the plurality of the memorized imaging environment data sets based on the check result; and applying the extracted imaging environment data set and analyzing the image.

The present invention can provide a system, a method, and a program for image analysis that improve the accuracy of detection and identification in image analysis by the use of parameters adapted to the environment in which the image is taken, in the system for image analysis that analyzes an image taken by a camera.

BRIEF DESCRIPTION OF DRAWINGS

FIG. 6 shows a table illustrating one example of the data structure of the imaging environment data set.

FIG. 7 shows a table illustrating one example of the data structure of the imaging environment data set in the case where an environment data set used for image analysis is newly stored.

DESCRIPTION OF EMBODIMENTS

Embodiments of the present invention will be described below with reference to the attached drawings. However, these are illustrative only, and the technological scope of the present invention is not limited thereto.

Overview of System for Image Analysis

Figure 1:
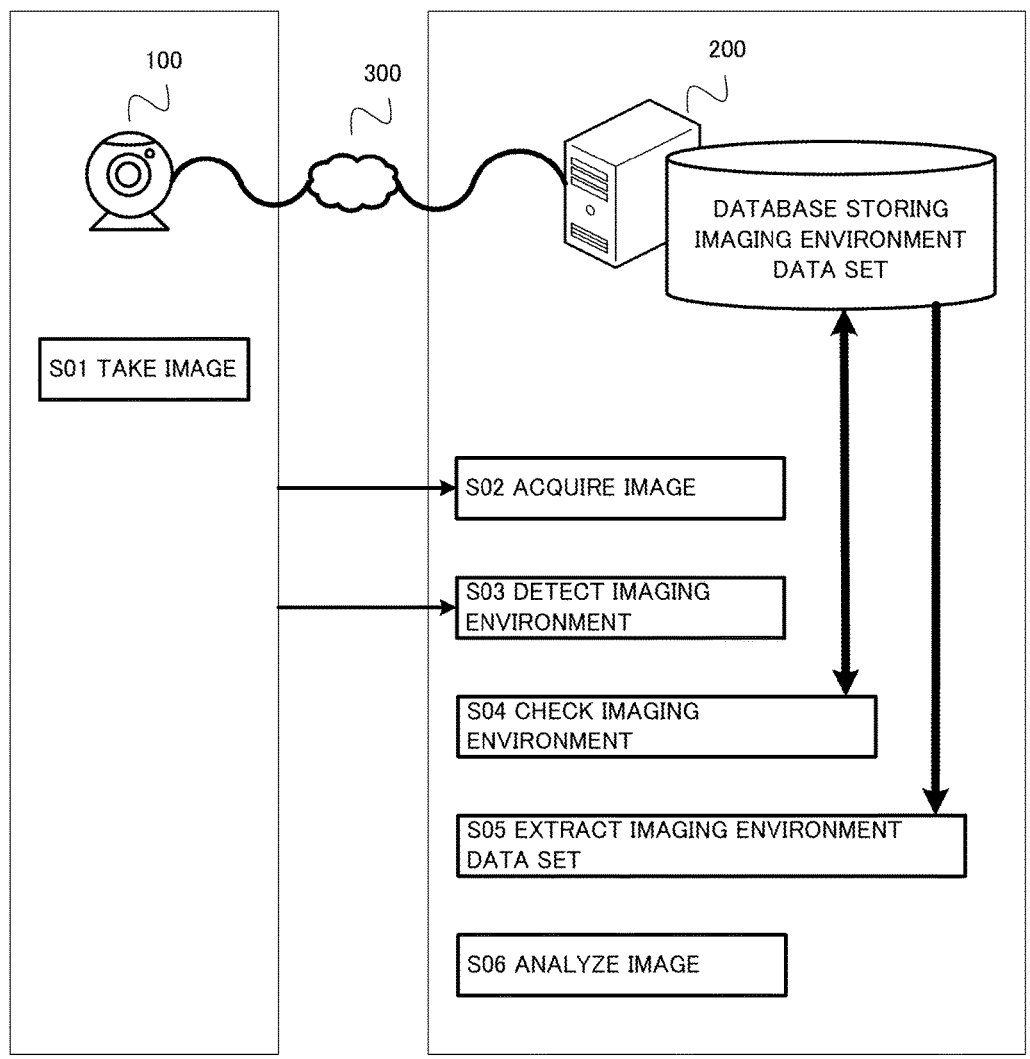
FIG. 1 shows a schematic diagram of a preferable embodiment of the present invention.

FIG. 1 shows a schematic diagram of a preferable embodiment of the present invention. The overview of the present invention will be described below with reference to FIG. 1. The system for image analysis includes a camera 100, a computer 200, and a communication network 300.

In FIG. 1, the number of the cameras 100 is not limited to one and may be two or more. Furthermore, the computer 200 is not limited to actual devices and may be virtual devices.

Figure 2:
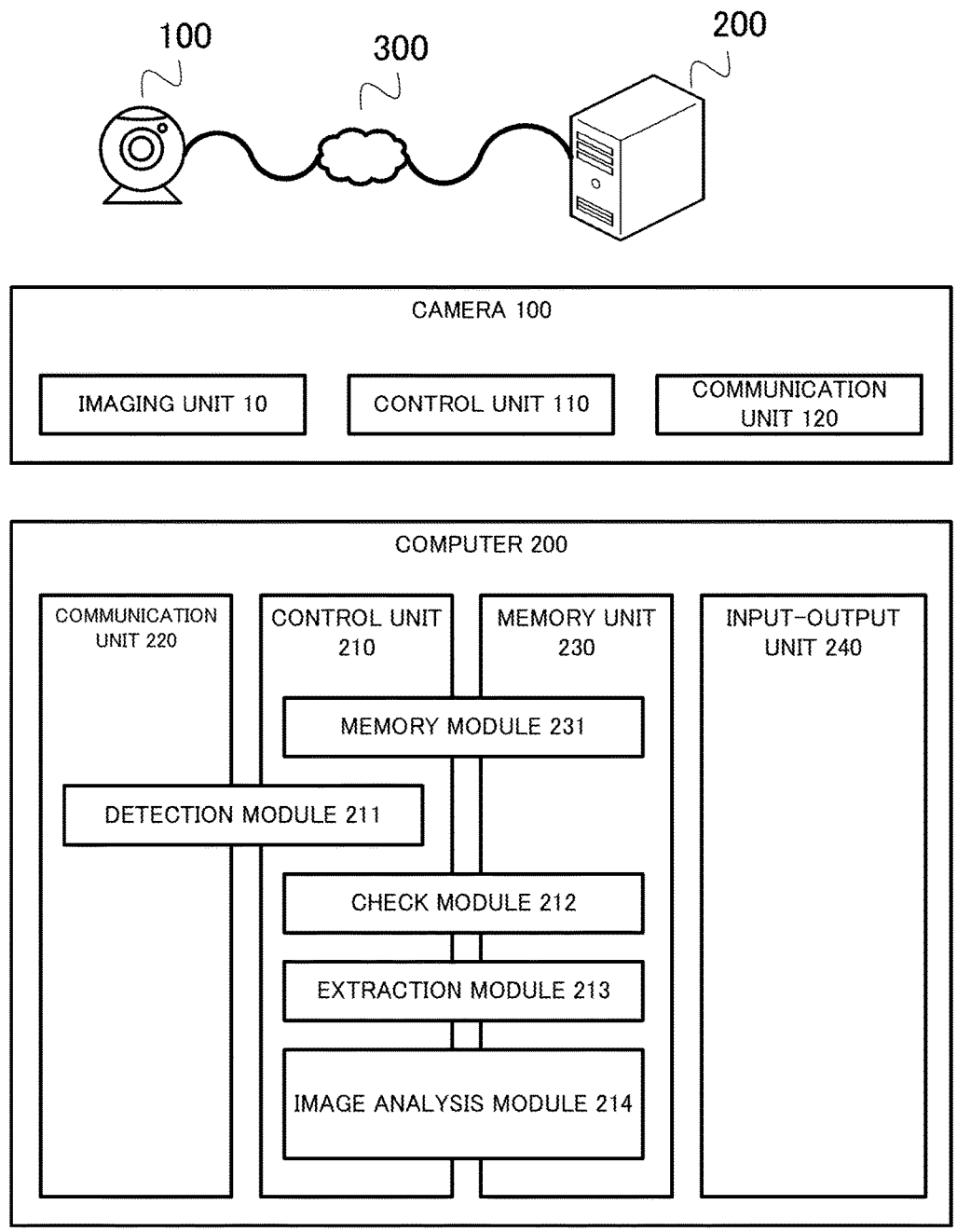
FIG. 2 shows a functional block diagram of the camera 100 and the computer 200 to illustrate the relationship among the functions.

The camera 100 includes an imaging unit 10, a control unit 110, and a communication unit 120 as shown in FIG. 2. The computer 200 includes a control unit 210, a communication unit 220, a memory unit 230, and an input-output unit 240 as shown in FIG. 2. The control unit 210 achieves a detection module 211 in cooperation with the communication unit 220. The control unit 210 also achieves a check module 212, an extraction module 213, and an image analysis module 214 in cooperation with the memory unit 230. The memory unit 230 achieves a memory module 231 in cooperation with the control unit 210. The communication network 300 may be a public line network such as the Internet or a private line network, which enables the communication between the camera 100 and the computer 200.

The camera 100 is provided with imaging devices such as an imaging element and a lens, which is capable of data communication with the computer 200. The camera 100 is also capable to determine the distance to an object or to image an object from two or more different directions at the same time. The attached drawings show a WEB camera as an example of the camera 100. However, the camera 100 may be an imaging device provided with necessary functions, such as a digital camera, a digital video, and a camera mounted on an uninhabited airborne vehicle or a wearable device, a security camera, a car-mounted camera, or a 360-degree camera.

The computer 200 is a computer device that is capable of data communication with the camera 100. The attached drawings show a desktop computer as an example of the computer 200. Examples of the computer 200 include electrical appliances such as a mobile phone, a mobile information terminal, a tablet terminal, a personal computer, a net book terminal, a slate terminal, an electronic book terminal, and a portable music player, and wearable terminals such as smart glasses and a head mounted display.

In the system for image analysis shown in FIG. 1, the computer 200 is provided with a database storing an imaging environment data set. The imaging environment data set is a set of environment data when an image is taken, including the angle in the horizontal direction of the camera when an image is taken, the type of an object, the distance to an object, the illuminance, the place, the weather, the type of the camera, and the resolution. The memory module 231 of the computer 200 previously associates the initial value of an image analysis parameter with excellent detection and identification accuracy of an object with each of a plurality of imaging environment data sets and stores them in the database storing an imaging environment data set.

The imaging unit 10 of the camera 100 takes an image such as a still or moving image of a target object (Step S01). The camera 100 images a human, an animal, a landscape, an article, a crop, a tree, etc., as an object.

The computer 200 acquires an image taken by the camera 100 through the communication unit 220 (Step S02).

The detection module 211 of the computer 200 detects environment data when the image is taken that are necessary as information on the imaging environment data set (Step S03). Examples of the imaging environment data set when an image is taken include the angle in the horizontal direction of the camera when an image is taken, the type of an object, the distance to an object, the illuminance, the place, the weather, the type of the camera, and the resolution. These data may be acquired directly from the camera 100 or detected by analyzing the image acquired in the step S02 on the computer 200.

Figure 5:
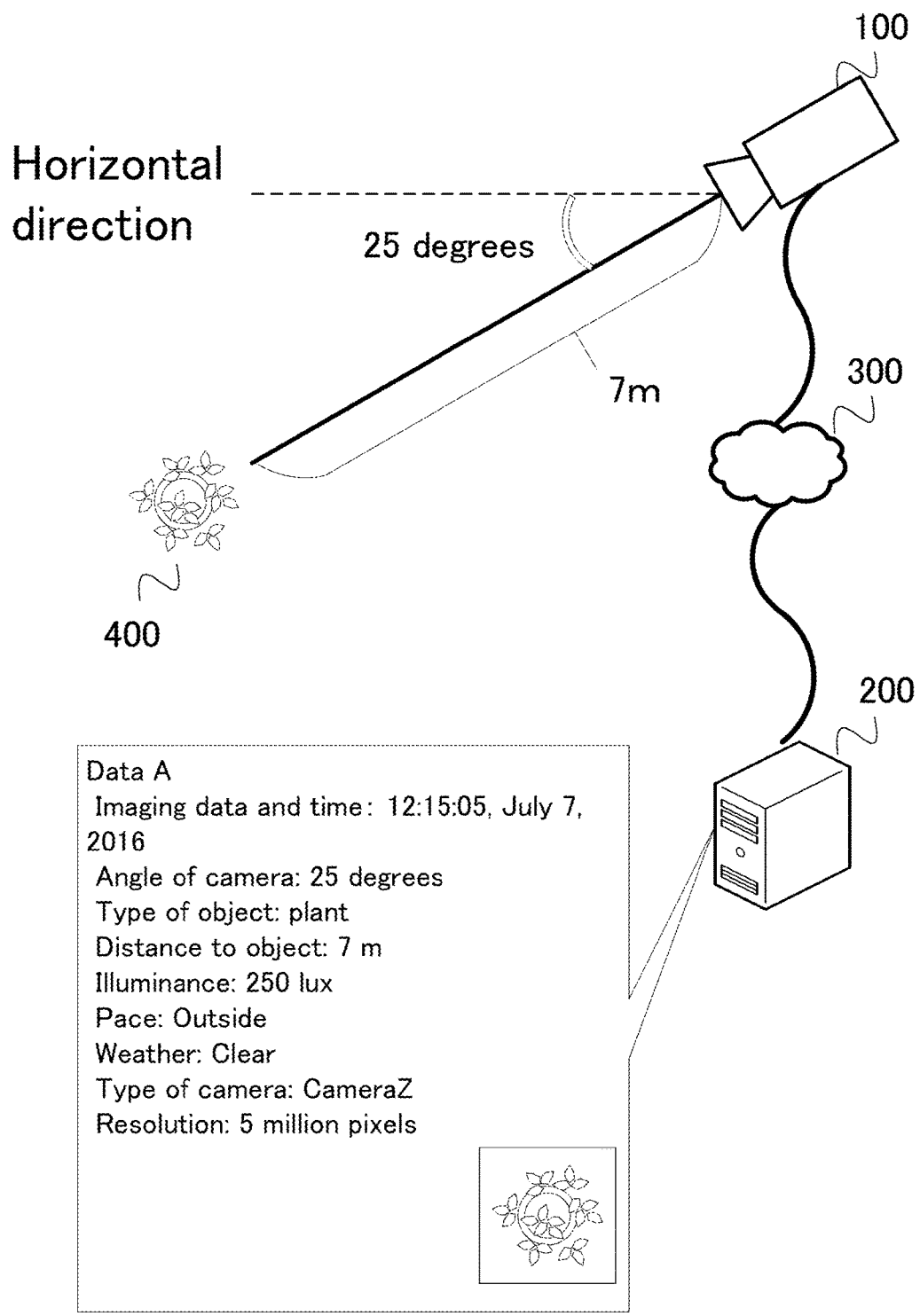
FIG. 5 shows one example where the camera 100 images an object 400.

FIG. 5 shows one example where the camera 100 images an object 400. This example shows that the detection module 211 of the computer 200 connected with the camera 100 through the communication network 300 detects the environment data of the image "Data A" taken at 12:15:05, Jul. 7, 2016, including "the angle in the horizontal direction of the camera when an image is taken: 25 degrees, the type of the object: a plant, the distance to the object: 7 meters, the illuminance: 250 lux, the place: outside, the weather: clear, the type of the camera: Camera Z, and the resolution: 5 million pixels." The angle in the horizontal direction of the camera when an image is taken (the angle of the camera) is acquired from the camera 100 or calculated on the computer 200 by the method to be described later. The type of an object is acquired from the camera 100 or detected by image analysis performed on the computer 200. The distance to an object is acquired from the camera 100 or detected by image analysis performed on the computer 200. The illuminance is acquired from the camera 100. The place is acquired from the camera 100 or detected by image analysis performed on the computer 200. When the place is outside, the weather is detected by image analysis performed on the computer 200 or acquired from weather information around the place of the camera 100 when an image is taken from the outside through the communication unit 220. The type of the camera is acquired from the camera 100 or previously registered in the computer 200. The resolution is acquired from the camera 100, registered in the computer 200 as the pixels of the camera 100, or calculated from the actual pixels of the image.

The check module 212 of the computer 200 compares the imaging environment data set of the image that is detected in the step S03 with the imaging environment data set registered in the database storing an imaging environment data set (Step S04).

FIG. 6 shows a table illustrating one example of the data structure of the imaging environment data set. In this example, the data structure shown in FIG. 6 is assumed to have been registered in the database storing an imaging environment data set. If the imaging environment data set detected in the step S03 is of the image of the object 400 shown in FIG. 5, the check process determines that the detected imaging environment data set is similar to the imaging environment data "Set4" including "the angle in the horizontal direction of the camera when an image is taken: 30 degrees, the type of the object: a plant, the distance to the object: 8 meters, the illuminance: 240 lux, the place: outside, the weather: clear, the type of the camera: Camera Z, and the resolution: 5 million pixels."

The extraction module 213 of the computer 200 extracts the environment data "Set4" similar to the detected imaging environment data set (Step S05).

The image analysis module 214 of the computer 200 preforms image analysis by using the initial value "ParamD" of the image analysis parameter associated with the imaging environment data set "Set4" (Step S06). The image analysis performed by using "ParamD" can obtain a better identification accuracy in a shorter time than by using the initial value "ParamA" of the image analysis parameter appropriate for the imaging environment data "Set1" including "the angle in the horizontal direction of the camera when an image is taken: 10 degrees, the type of the object: a human, the distance to the object: 3 meters, the illuminance: 100 lux, the place: outside, the weather: cloudy, the type of the camera: Camera X, and the resolution: 2.5 million pixels."

The image analysis is appropriately performed in accordance with specific purposes such as face recognition to identify an individual, check of the extent of the damage to farm products caused by harmful insects, check of warehouse inventory, and image recognition of an affected area for medical diagnosis. Examples of the image analysis parameter include a filter range, the intensity of a filter, a binarization threshold, and an image processing order, which are also appropriately selected in accordance with specific purposes.

As described above, the present invention can provide a system, a method, and a program for image analysis that improve the accuracy of detection and identification in image analysis by the use of parameters adapted to the environment in which the image is taken, in the system for image analysis that analyzes an image taken by a camera.

Functions

FIG. 2 shows a functional block diagram of the camera 100 and the computer 200 to illustrate the relationship among the functions. The camera 100 includes an imaging unit 10, a control unit 110, and a communication unit 120. The computer 200 includes a control unit 210, a communication unit 220, a memory unit 230, and an input-output unit 240. The control unit 210 achieves a detection module 211 in cooperation with the communication unit 220. The control unit 210 also achieves a check module 212, an extraction module 213, and an image analysis module 214 in cooperation with the memory unit 230. The memory unit 230 achieves a memory module 231 in cooperation with the control unit 210. The communication network 300 may be a public line network such as the Internet or a private line network, which enables the communication between the camera 100 and the computer 200.

The camera 100 is provided with imaging devices such as an imaging element and a lens, which is capable of data communication with the computer 200. The camera 100 is also capable to determine the distance to an object or to image an object from two or more different directions at the same time. The attached drawings show a WEB camera as an example of the camera 100. However, the camera may be an imaging device provided with necessary functions, such as a digital camera, a digital video, and a camera mounted on an uninhabited airborne vehicle or a wearable device, a security camera, a car-mounted camera, or a 360-degree camera.

The camera 100 also includes an imaging unit 10 including a lens, an imaging device, various buttons, and a flash, which takes an image such as a still or moving image. The obtained taken image is an accurate image with information as much as the image analysis needs. The pixel count and the image quality can be specified.

The control unit 110 includes a central processing unit (hereinafter referred to as "CPU"), a random access memory (hereinafter referred to as "RAM"), and a read only memory (hereinafter referred to as "ROM").

The communication unit 120 includes a device that is communicative to other devices, such as a Wireless Fidelity (Wi-Fi®) enabled device complying with, for example, IEEE 802.11, or a wireless device complying with the IMT-2000 standard such as the third and the fourth generation mobile communication systems. The communication unit may include a wired device for LAN connection.

The computer 200 is a computer device that is capable of data communication with the camera 100. The attached drawings show a desktop computer as an example of the computer 200. Examples of the computer 200 include electrical appliances such as a mobile phone, a mobile information terminal, a tablet terminal, a personal computer, a net book terminal, a slate terminal, an electronic book terminal, and a portable music player, and wearable terminals such as smart glasses and a head mounted display.

The control unit 210 includes a CPU, a RAM, and a ROM. The control unit 210 achieves a detection module 211 in cooperation with the communication unit 220. The control unit 210 also achieves a check module 212, an extraction module 213, and an image analysis module 214 in cooperation with the memory unit 230.

The communication unit 220 includes a device that is communicative to other devices, such as a Wi-Fi® enabled device complying with, for example, IEEE 802.11, or a wireless device complying with the IMT-2000 standard such as the third and the fourth generation mobile communication systems. The communication unit may include a wired device for LAN connection.

The memory unit 230 includes a data storage unit such as a hard disk or a semiconductor memory, which stores images and data necessary for processing the detection results of imaging environment, the check results of imaging environment, extracted imaging environment data sets, and the image analysis results. The memory unit 230 achieves a memory module 231 in cooperation with the control unit 210. The memory unit 230 may be provided with a database storing an imaging environment data set.

The input-output unit 240 has functions necessary to use the system for image analysis. As an example to achieve the input, the input-output unit 240 may include a liquid crystal display with a touch panel function, a keyboard, a mouse, a pen tablet, a hardware button on the device, and a microphone to perform voice recognition. As an example to achieve the output, the input-output unit 240 may take forms such as a liquid crystal display, a PC display, and a projector to display images and output voices. The features of the present invention are not limited in particular by an input-output method.

Image Analysis Process

Figure 3:
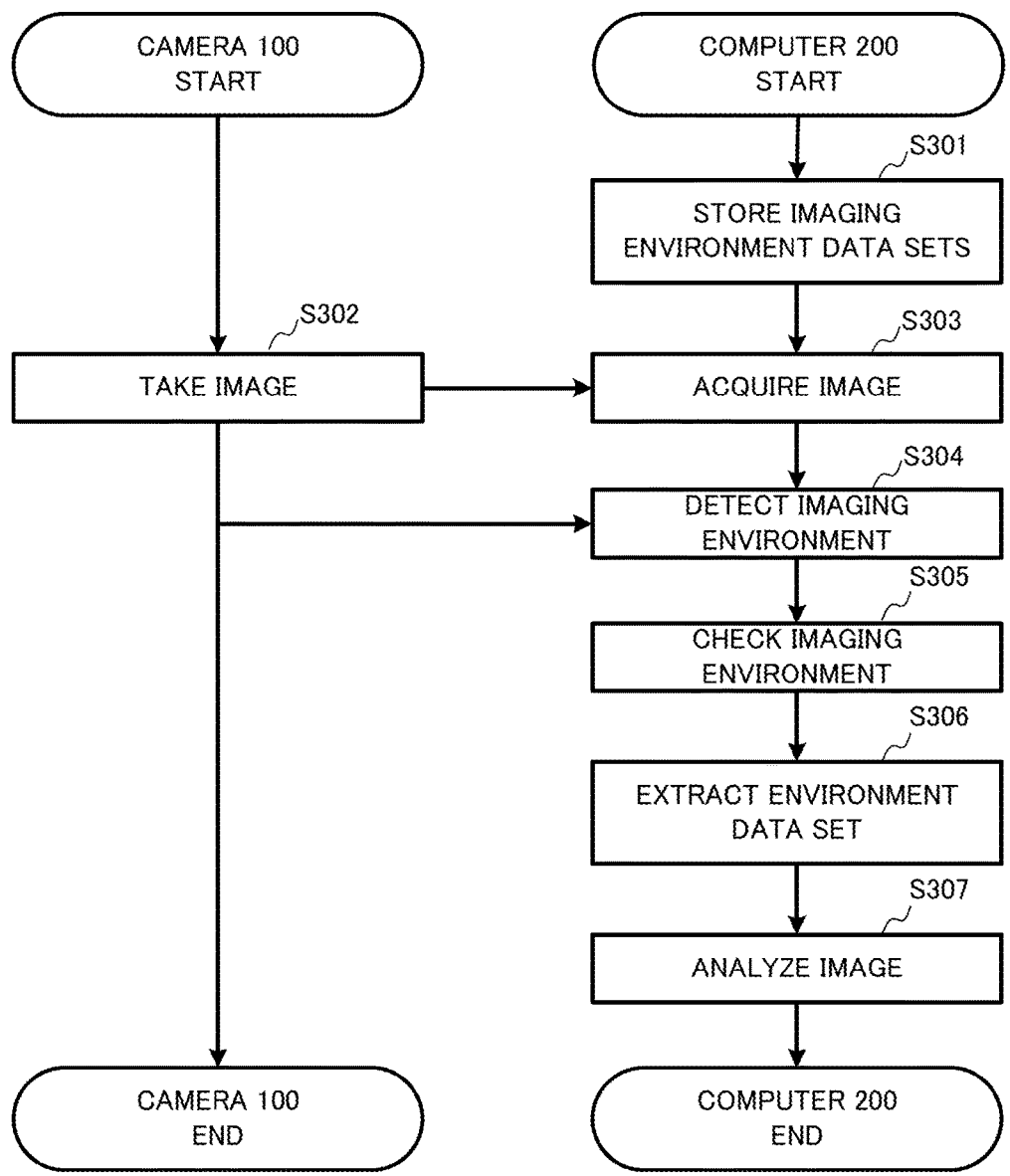
FIG. 3 shows a flow chart illustrating when the computer 200 analyzes an image taken by the camera 100.

FIG. 3 shows a flow chart illustrating the case where the computer 200 analyzes an image taken by the camera 100. The tasks executed by the modules will be described below with this process.

First, the memory module 231 of the computer 200 stores a plurality of imaging environment data sets in the memory unit 230 (Step S301). The memory unit 230 may be provided with a database storing an imaging environment data set to store a plurality of imaging environment data sets. The imaging environment data set is a set of environment data when an image is taken, including the angle in the horizontal direction of the camera when an image is taken, the type of an object, the distance to an object, the illuminance, the place, the weather, the type of the camera, and the resolution. The memory module 231 of the computer 200 previously associates the initial value of an image analysis parameter with excellent detection and identification accuracy of an object with each of the plurality of imaging environment data sets and stores them in the database storing an imaging environment data set. If the plurality of imaging environment data sets have already been stored, this process may be skipped.

Then, the imaging unit 10 of the camera 100 takes an image such as a still or moving image of a target object (Step S302). The camera 100 images a human, an animal, a landscape, an article, a crop, a tree, etc., as an object. The imaging instruction may be issued from the computer 200.

The computer 200 acquires an image taken by the camera 100 through the communication unit 220 (Step S303).

The detection module 211 of the computer 200 detects environment data when the image is taken that are necessary as information on the imaging environment data set (Step S304). Examples of the imaging environment data set when an image is taken include the angle in the horizontal direction of the camera when an image is taken, the type of an object, the distance to an object, the illuminance, the place, the weather, the type of the camera, and the resolution. These data may be acquired directly from the camera 100 or detected by analyzing the image acquired in the step S303 on the computer 200.

FIG. 5 shows one example where the camera 100 images an object 400. This example shows that the detection module 211 of the computer 200 connected with the camera 100 through the communication network 300 detects the environment data of the image "Data A" taken at 12:15:05, Jul. 7, 2016, including "the angle in the horizontal direction of the camera when an image is taken: 25 degrees, the type of the object: a plant, the distance to the object: 7 meters, the illuminance: 250 lux, the place: outside, the weather: clear, the type of the camera: Camera Z, and the resolution: 5 million pixels." The angle in the horizontal direction of the camera when an image is taken (the angle of the camera) is acquired from the camera 100 or calculated on the computer 200 by the method to be described later. The type of an object is acquired from the camera 100 or detected by image analysis performed on the computer 200. The distance to an object is acquired from the camera 100 or detected by image analysis performed on the computer 200. The illuminance is acquired from the camera 100. The place is acquired from the camera 100 or detected by image analysis performed on the computer 200. When the place is outside, the weather is detected by image analysis performed on the computer 200 or acquired from weather information around the place of the camera 100 when an image is taken from the outside through the communication unit 220. The type of the camera is acquired from the camera 100 or previously registered in the computer 200. The resolution is acquired from the camera 100, registered in the computer 200 as the pixels of the camera 100, or calculated from the actual pixels of the image.

The check module 212 of the computer 200 compares the imaging environment data set of the image that is detected in the step S304 with the imaging environment data set stored in the memory unit 230 (Step S305).

FIG. 6 shows a table illustrating one example of the data structure of the imaging environment data set. In this example, the data structure shown in FIG. 6 is assumed to have been registered in the database storing an imaging environment data set. If the imaging environment data set detected in the step S304 is of the image of the object 400 shown in FIG. 5, the check process determines that the imaging environment data "Set4" including "the angle in the horizontal direction of the camera when an image is taken: 30 degrees, the type of the object: a plant, the distance to the object: 8 meters, the illuminance: 240 lux, the place: outside, the weather: clear, the type of the camera: Camera Z, and the resolution: 5 million pixels" is similar to the detected imaging environment data set.

The extraction module 213 of the computer 200 extracts the environment data set "Set4" similar to the detected imaging environment data set (Step S306).

The image analysis module 214 of the computer 200 preforms image analysis by using the initial value "ParamD" of the image analysis parameter associated with the imaging environment data set "Set4" (Step S307). The image analysis performed by using "ParamD" can obtain a better identification accuracy in a shorter time than by using the initial value "ParamA" of the image analysis parameter appropriate for the imaging environment data "Set1" including "the angle in the horizontal direction of the camera when an image is taken: 10 degrees, the type of the object: a human, the distance to the object: 3 meters, the illuminance: 100 lux, the place: outside, the weather: cloudy, the type of the camera: Camera X, and the resolution: 2.5 million pixels."

The image analysis is appropriately performed in accordance with specific purposes such as face recognition to identify an individual, check of the extent of the damage to farm products caused by harmful insects, check of warehouse inventory, and image recognition of an affected area for medical diagnosis. Examples of the image analysis parameter include a filter range, the intensity of a filter, a binarization threshold, and an image processing order, which are also appropriately selected in accordance with specific purposes.

As described above, the present invention can provide a system, a method, and a program for image analysis that improve the accuracy of detection and identification in image analysis by the use of parameters adapted to the environment in which the image is taken, in the system for image analysis that analyzes an image taken by a camera.

Process to Additionally Store an Imaging Environment Data Set

Figure 4:
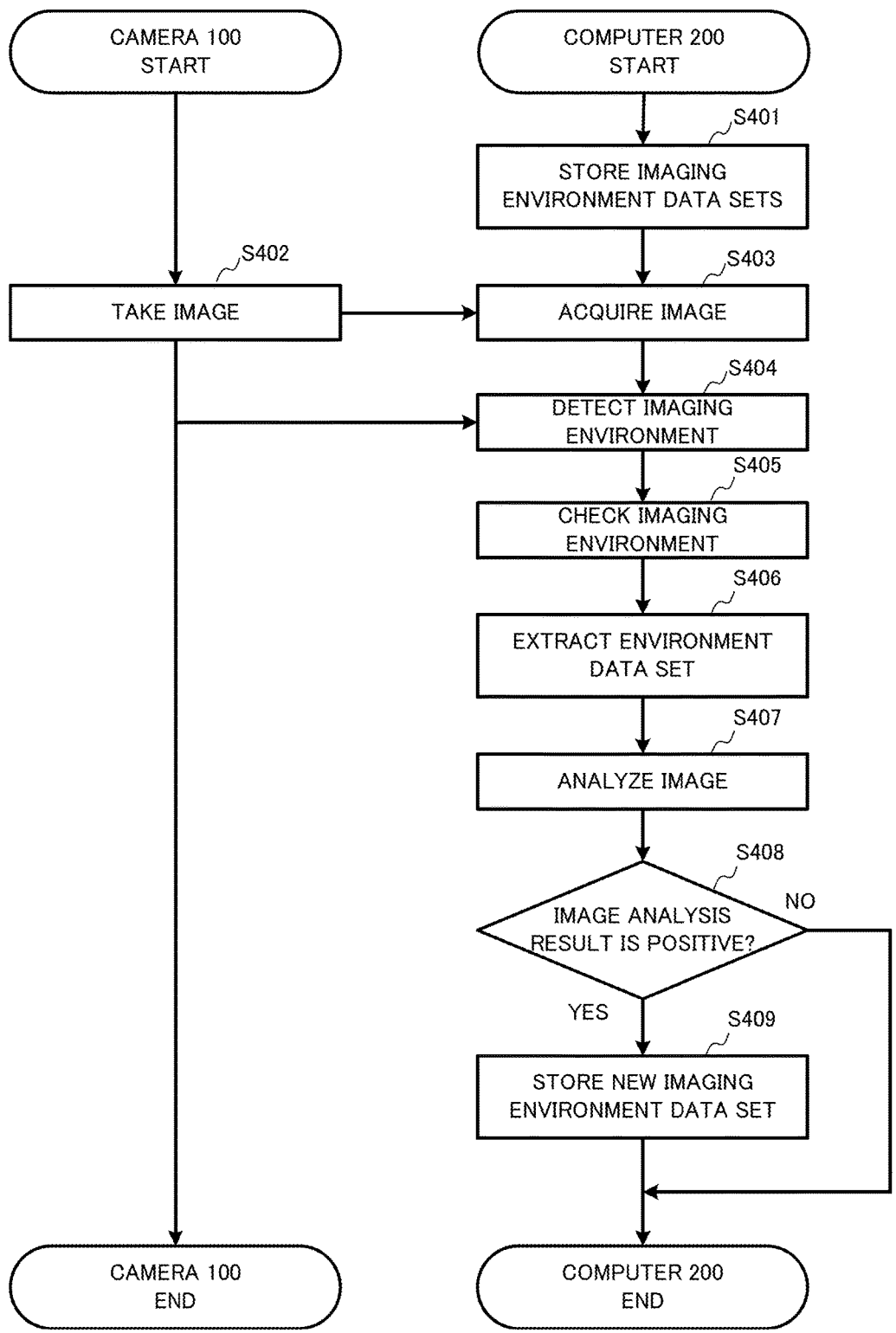
FIG. 4 shows a flow chart illustrating the case where an environment data set used for image analysis is newly stored.

FIG. 4 shows a flow chart illustrating the case where an environment data set used for image analysis is newly stored. The tasks executed by the modules will be described below with this process. Since the process from the step S401 to S407 shown in FIG. 4 corresponds to that from the step S301 to S307 shown in FIG. 3, the process from the step S408 will be described below.

After the image analysis in the step S407, the memory module 231 checks whether or not the image analysis result of using "ParamD" is positive (Step S408).

If the image analysis result of the step S407 is positive, the memory module 231 associates the imaging environment detected in the step S404 with "ParamD" and stores them as a new imaging environment data set (Step S409).

FIG. 7 shows a table illustrating one example of the data structure of the imaging environment data set in the case where an environment data set used for image analysis is newly stored. In the table shown in FIG. 6, the environment data set "Set5" including "the angle in the horizontal direction of the camera when an image is taken: 25 degrees, the type of the object: a plant, the distance to the object: 7 meters, the illuminance: 250 lux, the place: outside, the weather: clear, the type of the camera: Camera Z, and the resolution: 5 million pixels" that is associated with "ParamD" is additionally stored. Accordingly, the environment data set "Set5" is also available from the next time of imaging.

If the image analysis result of the step S407 is negative, the memory module 231 ends this process without performing any further steps.

In the step S408, whether or not the image analysis result is positive may be automatically or manually judged based on a threshold, etc., in accordance with specific purposes such as face recognition to identify an individual, check of the extent of the damage to farm products caused by harmful insects, check of warehouse inventory, and image recognition of an affected area for medical diagnosis.

As described above, the present invention can improve the accuracy of detection and identification in image analysis by the registration of a new imaging environment data set with positive image analysis result, in the system for image analysis that analyzes an image taken by a camera.

Process to Store an Imaging Environment Data Set Based on an Image

Figure 8:
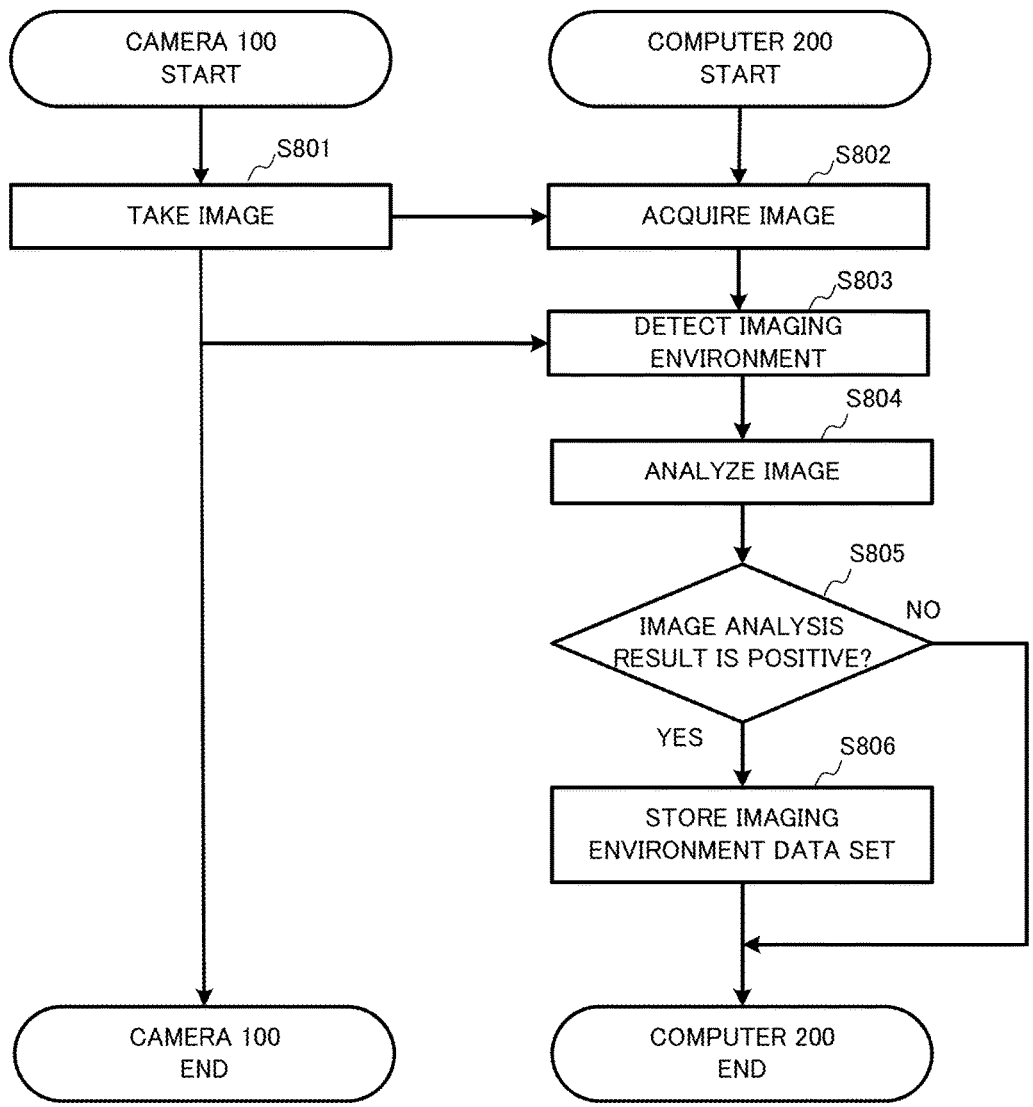
FIG. 8 shows a flow chart illustrating the case where an environment data set is stored based on an actual image.

FIG. 8 shows a flow chart illustrating the case where an environment data set is stored based on an actual image. The tasks executed by the modules will be described below with this process.

First, the imaging unit 10 of the camera 100 takes an image such as a still or moving image of a target object (Step S801). The camera 100 images a human, an animal, a landscape, an article, a crop, a tree, etc., as an object.

The computer 200 acquires an image taken by the camera 100 through the communication unit 220 (Step S802).

The detection module 211 of the computer 200 detects necessary environment data when the image is taken (Step S803). Examples of the imaging environment data set when an image is taken include the angle in the horizontal direction of the camera when an image is taken, the type of an object, the distance to an object, the illuminance, the place, the weather, the type of the camera, and the resolution. These data may be acquired directly from the camera 100 or detected by analyzing the image acquired in the step S802 on the computer 200.

The image analysis module 214 of the computer 200 analyzes the image (Step S804). In this example, an appropriate initial value of the image processing parameter is not specified. Thus, the image processing parameter may be tuned. For the tuning, there may be a restriction on time, etc., as a function of the system. In this example, the parameter finally used is stored as "ParamX" in the memory unit 230.

The image analysis is appropriately performed in accordance with specific purposes such as face recognition to identify an individual, check of the extent of the damage to farm products caused by harmful insects, check of warehouse inventory, and image recognition of an affected area for medical diagnosis. Examples of the image analysis parameter include a filter range, the intensity of a filter, a binarization threshold, and an image processing order, which are also appropriately selected in accordance with specific purposes.

After the image analysis in the step S804, the memory module 231 checks whether or not the image analysis result of using "ParamX" is positive (Step S805).

If the image analysis result of the step S804 is positive, the memory module 231 associates the imaging environment detected in the step S803 with "ParamX" and stores them as a new imaging environment data set (Step S806).

If the image analysis result of the step S804 is negative, the memory module 231 ends this process without performing any further steps.

In the step S804, whether or not the image analysis result is positive may be automatically or manually judged based on a threshold, etc., in accordance with specific purposes such as face recognition to identify an individual, check of the extent of the damage to farm products caused by harmful insects, check of warehouse inventory, and image recognition of an affected area for medical diagnosis.

As described above, the present invention can save more steps by the registration of a new imaging environment data set based on the image than the case where the imaging environment data set is manually input, in the system for image analysis that analyzes an image taken by a camera.

Process to Acquire the Angle of a Camera

The camera 100 in the present invention is also capable to determine the distance to an object or to image an object from two or more different directions at the same time. The distance can be acquired from a sensor, etc., of the camera 100. If an object can be imaged from the two or more different directions at the same time, the distance can be determined by learning the length of the difference between the images taken by the two or more cameras and an actual distance. Moreover, the determined distance can be used to calculate the angle of a camera 100. Since how to determine the distance by the use of the two or more cameras is known as an existing technology, how to acquire the angle of a camera 100 will be explained herein below with reference to FIG. 9.

Figure 9:
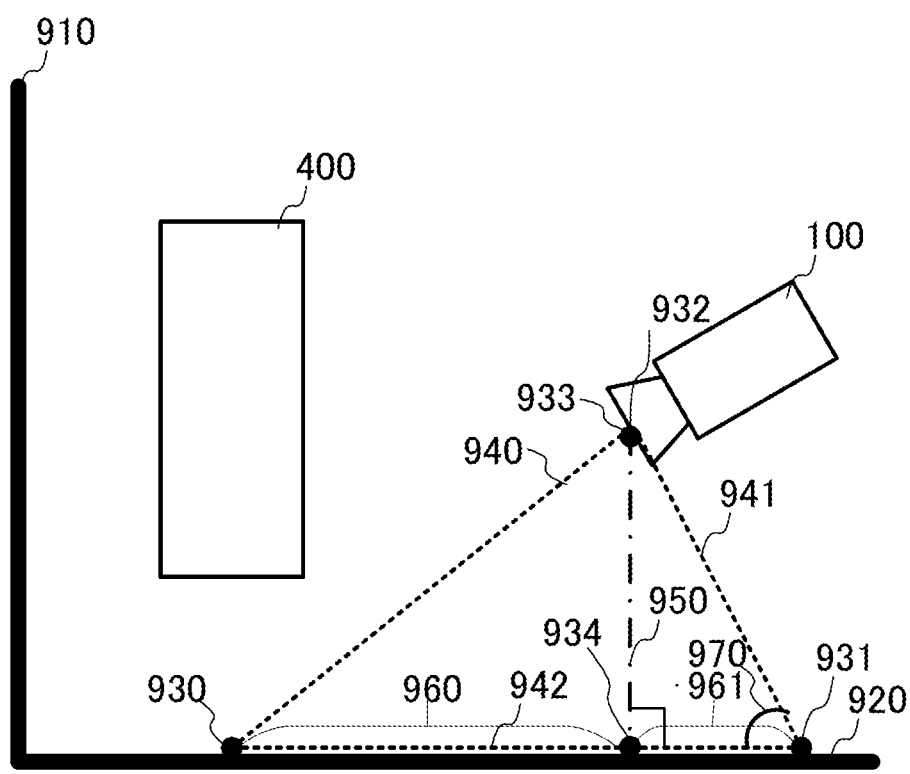
FIG. 9 schematically shows how the camera 100 acquires its angle.

FIG. 9 schematically shows how the camera 100 acquires its angle. In FIG. 9, the camera 100 is imaging an object 400, a wall 910, and a floor 920. The camera 100 or the computer 200 analyzes an image. If acquiring the angle of a camera 100, the camera 100 or the computer 200 recognizes the maximum area with a same pattern in an image as a plane such as a floor or a ground and acquires the angle of the camera 100 based on the inclination of the plane. In this example, the floor 920 corresponds to the plane.

The angle of a camera 100 may be acquired by the camera 100 or the computer 200. However, in the following description, the computer 200 acquires the angle of a camera 100 for the simplification. The computer 200 extracts two predetermined positions 930, 931 on the floor 920 as samples. The computer 200 connects the predetermined positions 930, 931 and the center position 932 of the imaging location to form a triangle 933. The triangle 933 has three sides 940, 941, 942. The computer 200 forms a perpendicular line 950 from the center position 932 to the floor 920 and then the intersection point 934 of the side 942 with the perpendicular line 950. The computer 200 learns the length of the difference between the images taken by two or more cameras and an actual distance, estimates the distance, and then calculates the lengths of the sides 940, 941 and the perpendicular line 950. The computer 200 calculates the lengths of the line segment 960 connecting the predetermined position 930 with the intersection point 934 and the line segment 961 connecting the predetermined position 931 with the intersection point 934 in the side 942. The computer 200 calculates the angle 970 by trigonometric substitution and acquires this angle 970 as the three-dimensional angle of the camera 100.

As described above, the present invention can calculate the distance to an object and the angle in the horizontal direction when the image is taken, by the use of the function to take an image of an object from two or more different directions at the same time, even if the camera 100 has no functions to determine the distance to an object.

To achieve the means and the functions that are described above, a computer (including a CPU, an information processor, and various terminals) reads and executes a predetermined program. For example, the program may be provided from a computer through a network, specifically, through Software as a Service (SaaS) or may be provided in the form recorded in a computer-readable medium such as a flexible disk, CD (e.g., CD-ROM), DVD (e.g., DVD-ROM, DVD-RAM), or a compact memory. In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

REFERENCE SIGNS LIST

100 Camera
200 Computer
300 Communication network
400 Object

What is claimed is:

1. A system for image analysis, comprising:
a memory unit that memorizes a plurality of imaging environment data sets that include setting data of a camera that takes an image and data on an object;
a detection unit that detects the imaging environment of the image from the camera;
a check unit that checks the detected imaging environment with the memorized imaging environment data sets;
an extraction unit that extracts an imaging environment data set similar to the detected imaging environment from the plurality of the memorized imaging environment data sets based on the check result; and
an image analysis unit that applies the extracted imaging environment data set and analyzes the image,
wherein the imaging environment data set includes the angle of the camera and the distance from the camera to the object.

2. The system according to claim 1, wherein the memory unit memories the imaging environment data set applied by the image analysis unit as a new imaging environment data set.

3. The system according to claim 1, wherein the imaging environment data set is 360-degree imaging data.

4. A method for image analysis, comprising the steps of:
memorizing a plurality of imaging environment data sets that include setting data of a camera that takes an image and data on an object;
detecting the imaging environment of the image from the camera;
memorizing a plurality of imaging environment data sets that include setting data of a camera that takes an image and data on an object;
extracting an imaging environment data set similar to the detected imaging environment from the plurality of the memorized imaging environment data sets based on the check result; and
applying the extracted imaging environment data set and analyzing the image,
wherein the imaging environment data set includes the angle of the camera and the distance from the camera to the object.

5. A computer program product for use in a system for controlling a drone, comprising a non-transitory computer usable medium having a set of instructions physically embodied therein, the set of instructions including computer readable program code, which when executed by the system causes an information processing unit to execute the steps of:
memorizing a plurality of imaging environment data sets that include setting data of a camera that takes an image and data on an object;
detecting the imaging environment of the image from the camera;
memorizing a plurality of imaging environment data sets that include setting data of a camera that takes an image and data on an object;
extracting an imaging environment data set similar to the detected imaging environment from the plurality of the memorized imaging environment data sets based on the check result; and
applying the extracted imaging environment data set and analyzing the image,
wherein the imaging environment data set includes the angle of the camera and the distance from the camera to the object.

* * * * *